(12) United States Patent
Zimmer et al.

(10) Patent No.: US 10,585,702 B2
(45) Date of Patent: *Mar. 10, 2020

(54) SYSTEM AND METHOD FOR SUPPORTING METERED CLIENTS WITH MANYCORE

(71) Applicant: Intel Corporation, Santa Clara, CA (US)

(72) Inventors: Vincent J. Zimmer, Federal Way, WA (US); Michael A. Rothman, Puyallup, WA (US); Mark Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 755 days.

This patent is subject to a terminal disclaimer.

(21) Appl. No.: 14/171,509

(22) Filed: Feb. 3, 2014

(65) Prior Publication Data

US 2014/0149992 A1 May 29, 2014

Related U.S. Application Data

(63) Continuation of application No. 11/967,617, filed on Dec. 31, 2007, now Pat. No. 8,645,965.

(51) Int. Cl.
*G06F 9/46* (2006.01)
*G06F 13/00* (2006.01)
(Continued)

(52) U.S. Cl.
CPC .............. *G06F 9/50* (2013.01); *G06F 9/5077* (2013.01); *G06F 2209/5012* (2013.01)

(58) Field of Classification Search
None
See application file for complete search history.

(56) References Cited

U.S. PATENT DOCUMENTS 6,314,501 B1 * 11/2001 Gulick ...................... G06F 9/54
711/153
6,581,159 B1 6/2003 Nevis et al.
(Continued)

FOREIGN PATENT DOCUMENTS

JP 3105110 B2 10/2000

OTHER PUBLICATIONS

Jim Mithcell et al., "IBM Power5 Processor-based Servers: A Highly Available Design for Business-Critical ApplicationIBM p and System i Platform Reliability, Availability and Serviceability (RAS)", Aug. 16, 2006 (Aug. 16, 2006), XP055245953, Internet Article.

(Continued)

*Primary Examiner* — Bing Zhao
(74) *Attorney, Agent, or Firm* — Blakely, Sokoloff, Taylor & Zafman LLP

(57) ABSTRACT

In some embodiments, the invention involves partitioning resources of a manycore platform for simultaneous use by multiple clients, or adding/reducing capacity to a single client. Cores and resources are activated and assigned to a client environment by reprogramming the cores' route tables and source address decoders. Memory and I/O devices are partitioned and securely assigned to a core and/or a client environment. Instructions regarding allocation or reallocation of resources is received by an out-of-band processor having privileges to reprogram the chipsets and cores. Other embodiments are described and claimed.

20 Claims, 7 Drawing Sheets

(51) Int. Cl.
*G06F 15/00* (2006.01)
*G06F 9/50* (2006.01)

(56) References Cited

U.S. PATENT DOCUMENTS

| | | | | |
|---|---|---|---|---|
| 6,647,422 | B2* | 11/2003 | Wesinger, Jr. | G06F 17/3089 707/E17.116 |
| 7,222,262 | B2 | 5/2007 | Prasadh et al. | |
| 7,697,454 | B2 | 4/2010 | Smith | |
| 2003/0031148 | A1 | 2/2003 | Schmidt et al. | |
| 2003/0037224 | A1* | 2/2003 | Oehler | G06F 9/5061 712/29 |
| 2004/0003063 | A1 | 1/2004 | Ashok | |
| 2004/0199632 | A1 | 10/2004 | Romero | |
| 2005/0149934 | A1 | 7/2005 | Doolittle et al. | |
| 2006/0184480 | A1 | 8/2006 | Ayyar et al. | |
| 2006/0184938 | A1* | 8/2006 | Mangold | G06F 9/5016 718/1 |
| 2007/0239386 | A1* | 10/2007 | Capps | G01R 31/2868 702/117 |

OTHER PUBLICATIONS

Office Action from Counterpart EPD Patent Application No. EPD12155060.2, dated Feb. 4, 2016, 6 pages.
Wu, C. Eric et al., "An Advanced Accounting Service for AIX Systems", Proceedings of the 2005 IEEE International Conference on Services Computing (SCC'05), vol. 2, Jul. 11-15, 2005, pp. 6-13.
Office Action received for Chinese Patent Application No. 200810190343.3, dated Mar. 9, 2011, 5 pages of English Translation and 5 pages of Office Action.
Extended Search Report received for European Patent Application No. 08171402.4, dated Mar. 10, 2009, 8 pages.
IBM, "Dynamic Logical Partitioning in IBM @server pSeries", Oct. 8, 2002, 13 pages.
Raj, Himanshu et al., "Self-Virtualized I/O: High Performance, Scalable I/O Virtualization in Multi-core Systems", GIT-CERCS-06-02, Center for Experimental Research in Computer Systems (CERCS) Technical Reports 2006, pp. 1-23.
Examination Report dated Feb. 21, 2017 for European Patent Application No. 08171402.4.
Examination Report dated Feb. 24, 2017 for European Patent Application No. 12155060.2.

* cited by examiner

SYSTEM AND METHOD FOR SUPPORTING METERED CLIENTS WITH MANYCORE

CLAIM OF PRIORITY AND RELATED APPLICATIONS

This application is a continuation application of U.S. patent application Ser. No. 11/967,617, by Vincent J. Zimmer, et al., entitled "System and Method for Supporting Metered Clients with Manycore", filed Dec. 31, 2007, issued as U.S. Pat. No. 8,645,965 on Feb. 4, 2014, the benefit of and priority to which are claimed thereof and the entire contents of which are incorporated herein by reference.

FIELD OF THE INVENTION

An embodiment of the present invention relates generally to manycore processing environments, and, more specifically, to partitioning resources of a manycore platform for simultaneous use by multiple clients, or additional capacity to a single client.

BACKGROUND INFORMATION

Various mechanisms exist for supporting multiple clients on a single computing device. Some legacy methods on main frames included timesharing of clients, where only one process was actually running at a time, but each client's process received a share of available processing time. Other methods for multiple clients to operate on a single computing device include using virtual machines with a virtual machine monitor to control devices and active processes.

An existing model for sharing a computing device among many users is known as the Internet Café model. In this business method, a number of computing devices are co-located in a café or other business establishment. A user pays for use, often limited by time, and logs on to the computing device. When the user is finished, the computing device may be rebooted in preparation for another user to log on and use the resource. Rebooting, however, is inefficient as it requires significant downtime of the resource, over time. As computing resources on a single platform increase, for instance, with multi-core platforms and faster processors, single user platforms will tend to be underutilized in this type of environment.

The existing Internet Café model entails having a single machine/user. Single user platforms incur manageability costs and difficulty in scaling, for instance, to provide a pedestal personal computer (PC) in front of each user. The cost of the equipment is also another issue. Security of the hardware may be a problem as well, since users are typically co-located with the processor and peripherals used.

BRIEF DESCRIPTION OF THE DRAWINGS

The features and advantages of the present invention will become apparent from the following detailed description of the present invention in which.

DETAILED DESCRIPTION

Figure 1:
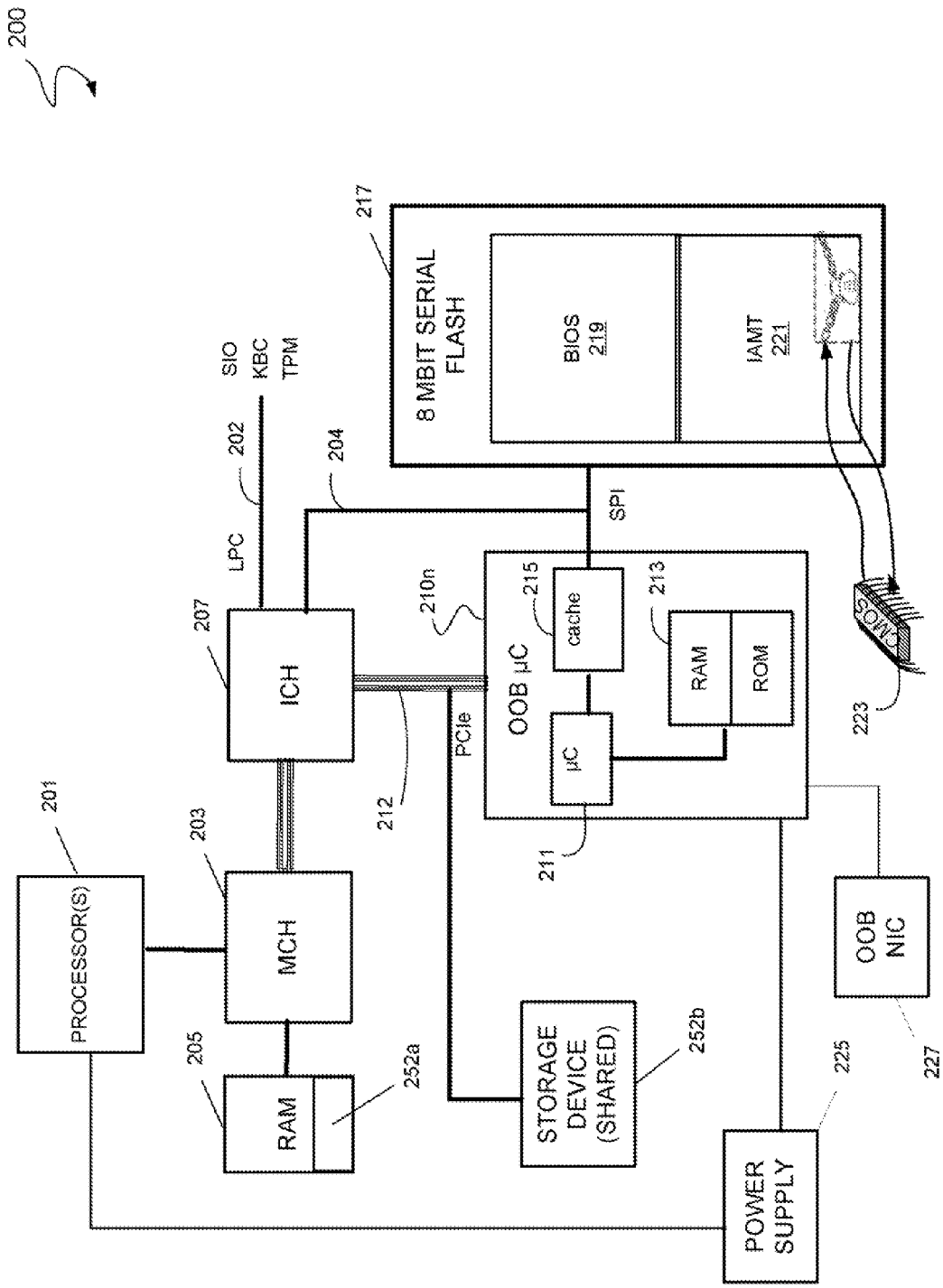
FIG. 1 is a block diagram illustrating an exemplary topology for the multi-user manycore platform with an out-of-band microcontroller, according to embodiments of the invention.

An embodiment of the present invention is a system and method relating to taking advantage of the multi-core technology, also known as manycore, for a platform having typically more than eight processing cores, in order to provide metered client usage for multiple clients. In the context of the description below, a core is to be understood as a processing unit in a processor on a single socket. For instance, a processor within a socket may have eight cores, or compute nodes within the processor. This is to be distinguished from multi-processor systems that have a single processor in a single socket. A platform may be both multi-processor and multi-core. For instance a multi-processor platform may have four multi-core processors, each multi-core processor in a single socket. In a four socket platform, with each socket having a four-core processor, the effective number of processing units on the platform will be 16. Other business models for simultaneously enabling multiple clients secure access to the platform are described in alternative embodiments.

In at least one embodiment, the present invention is intended to use out-of-band communication with an administrator or administrative console to partition and assign cores and resources on the platform to multiple users, or clients. For instance, resources that may be assigned to different sessions or clients include: processing cores, memory and I/O devices. In an embodiment, different clients/sessions may be allocated a varying number of resources.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

A metered computing environment in emerging markets, for instance, those that have embraced the Internet Café model, may have centrally-located service support of clients with multi-core capabilities, such as available from Intel Corporation. Several platforms with manycore technology are either planned or will be deployed in the future to better take advantage of embodiments of the present invention. Specifically, embodiments of the invention having manycore-based CPU sockets, as available from Intel Corp., may host a series of clients in an Internet Café (Icafé) and optional usage time metering. Another time metering application is available using Microsoft® FlexGo software. More information about this type of metering may be found on the public Internet at URL www*Microsoft*com/whdc/payasyougo/. Note that periods have been replaced with asterisks in URLs in this document to prevent inadvertent hyperlinks.

Embodiments of the invention allocate system sources on demand, to different client sessions. In existing systems, IBM System i™ Capacity on Demand uses a method by which inactive processing power may be activated, on demand, by a system administrator. Specifically, a platform is shipped with some compute power in a deactivated state. When the platform owner decides that additional capacity is required, the owner pays the vendor for some incremental increase in capacity, up to and including all that is available on the platform. The vendor sends the administrator/owner an authorization code and the administrator enters the code to activate the additional capacity. A reboot may typically be required to activate the additional capacity. However, this method does not allocate previously activated individual cores and network resources to different clients for metered processing, on the fly. Further, embodiments of the present invention may allocate and reallocate cores and other resources, dynamically. More information about IBM System i™ Capacity on Demand may be found on the public Internet at URL www-03*ibm*com/systems/i/hardware/cod/index.html.

Embodiments of the invention allow for a single platform to support 32+ users with the same memory and processor isolation as a separate machine; in other words, there is no need for a third party virtual machine monitor. Intel® processors to be deployed with 32 cores are representative of the emergent architecture to support embodiments of the invention, with one of the manycores reserved per user. It will be understood that processors having any number of cores in excess of one may be employed in embodiments of the invention. The ability to employ replicated I/O in future input/output controller hubs (ICH's), and the partitioning capability of a platform resource layer, or embedded partition architecture, make embodiments of the present invention viable.

An embodiment of the invention may utilize a manycore processor with a hardware partition manager to dedicate specific memory, network I/O, and processor resources to a given Internet Café user. Each user merely has access to a simple terminal with a screen and keyboard/mouse input. The central location of the storage and processor resources allows for physical security. A blade server with the manycore processors may be kept in a locked cabinet in the Icafé, thus obviating concerns about the user stealing computing system components.

An advantage of embodiments of the invention arises from the physical security of isolated processors and memory and NIC/client session. This contrasts with existing server consolidation using an operating system (OS) process/client (brittle kernel-mode sharing) or virtual machine monitor (VMM) architecture.

FIG. 1 is a block diagram illustrating an exemplary topology for the multi-user manycore platform with an out-of-band microcontroller (OOB µcontroller), according to embodiments of the invention. A platform 200 comprises a processor 201. The processor 201 may be connected to random access memory 205 via a memory controller hub 203. Processor 201 may be any type of processor capable of executing software, such as a microprocessor, digital signal processor, microcontroller, or the like. Though FIG. 1 shows only one such processor 201, there may be one or more processors in the platform 200 and one or more of the processors will include multiple cores, or the like.

The processor 201 may be further connected to I/O devices via an input/output controller hub (ICH) 207. The ICH may be coupled to various devices, such as a super I/O controller (SIO), keyboard controller (KBC), or trusted platform module (TPM) via a low pin count (LPC) bus 202. The SIO, for instance, may have access to floppy drives or industry standard architecture (ISA) devices. In an embodiment, the ICH is coupled to non-volatile memory via a serial peripheral interface (SPI) bus 204. The non-volatile memory may be FLASH memory or static random access memory (SRAM), or the like. An out-of-band (OOB) µcontroller 210n may be present on the platform 200. The OOB µcontroller 210n may connect to the ICH via a bus 212, typically a peripheral component interconnect (PCI) or PCI express bus. The OOB µcontroller may also be coupled with the non-volatile memory store (NV store) 217 via the SPI bus 204. The NV store 217 may be FLASH memory or static RAM (SRAM), or the like. In many existing systems, the NV store is FLASH memory.

The OOB µcontroller 210n may be likened to a "miniature" processor. Like a full capability processor, the OOB µcontroller has a processor unit 211 which may be operatively coupled to a cache memory 215, as well as RAM and ROM memory 213. The OOB µcontroller may have a built-in network interface 227 and independent connection to a power supply 225 to enable out-of-band communication even when the in-band processor 201 is not active.

In embodiments, the processor has a basic input output system (BIOS) 219 in the NV store 217. In other embodiments, the processor boots from a remote device (not shown) and the boot vector (pointer) resides in the BIOS portion 219 of the NV store 217. The OOB µcontroller 2100n may have access to all of the contents of the NV store 217, including the BIOS portion 219 and a protected portion 221 of the non-volatile memory. In some embodiments, the protected portion 221 of memory may be secured with Intel® Active Management Technology (iAMT). In an embodiment, the portion 221 of the NV store is protected from access by the firmware based on chipset selections in a base address register (BAR). More information about iAMT may be found on the public Internet at URL www*intel*com/technology/manage/iamt/.

Since the BIOS portion 219 of non-volatile memory may be modified by the OS or applications running within the OS, it may be vulnerable to malicious tampering. The protected area of memory 221, available only to the OOB µcontroller, may be used to store critical boot vector, or other information, without risk of tampering. The only way to access the OOB µcontroller side of the NV store 217 is through verification via a proxy through the OOB µcontroller, i.e., signature authentication or the like. Embodiments of the present invention may utilize a hardware protected region 221 of the non-volatile memory 217 and make the protected region inaccessible to the OS.

In some embodiments, a CMOS chip 223 accommodates systems with legacy firmware. In these legacy systems, boot settings may be stored on the CMOS in proprietary formats, rather than in a NV store like FLASH memory. A snapshot of CMOS settings may be stored in a known location. Some embodiments may have FLASH memory 217 and CMOS 223.

In an embodiment, implementation of "mailboxes" to pass messages and data between the in-band (host processor communication) and out-of-band processor may be according to techniques discussed in U.S. patent application Ser. No. 10/964,355, entitled "BUS COMMUNICATION EMULATION" to Rothman et al. and filed on Oct. 12, 2004.

The OOB µcontroller 210n may be operated to store a "message" containing a directive in a memory shared by the OOB µcontroller 2100n and a processor of the computer system such as the processor 201 of the host computer 200. In the illustrated embodiment, the host computer 200 includes a shared memory 252 which is accessible by both the processor 201 and the OOB µcontroller 210n. The shared memory 252 may reside in a reserved area of RAM 252a, or be located in a separate non-volatile memory store 252b, or the like. The shared memory may be operated as a mailbox for these messages. Thus, in one aspect, the OOB µcontroller 210n may store a message in the shared memory 252 or retrieve a message from the shared memory 252, independently of the status of the host computer 200 including the status of the processor 201, the operating system and the programs. Thus, in the illustrated embodiment, the OOB µcontroller 210n may store or retrieve messages in the shared memory 252 whether the Processor 201 is being initialized or is turned off, or whether the operating system is booting, running, crashed or otherwise.

To facilitate such independent operation, in this example, the controller 210n, the shared memory 252, the local bus 212 and other components as appropriate may be powered independently of the main components of the host computer 200 including the processor 201 and the host memory 205. The shared memory 252 may be non-volatile (NV) memory such as FLASH memory or static random access memory (SRAM). In embodiments described in more detail below, the OOB µcontroller 210n operates independently of the operating system or system start-up program, such that the OOB µcontroller 210n may have its own dedicated control circuitry, firmware, operating system, etc. to control the operations of the OOB µcontroller 210n independently of the status of the remainder of the host computer 200. It is appreciated that the degree of operational independence, if any, of the controller 210n and other components may vary, depending upon the particular application.

In embodiments of the present invention, the OOB µcontroller 210n communicates, out-of-band, with an administrator or administrative console program to reallocate resources of the manycore processor based on client demand.

Figure 2:
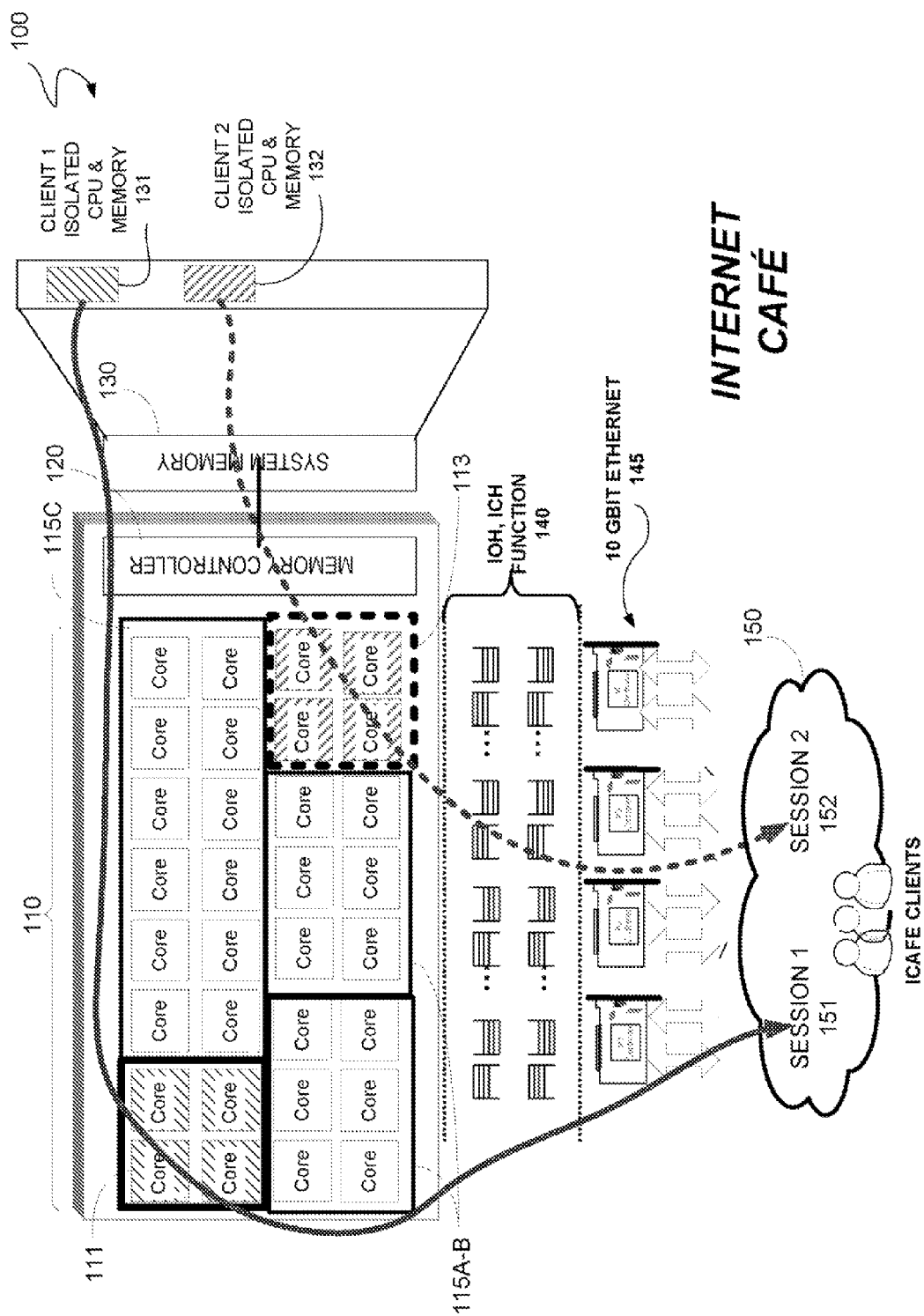
FIG. 2 is a block diagram illustrating the manycore architecture of a platform, according to embodiments of the invention.

FIG. 2 is a block diagram illustrating the manycore architecture of a platform, according to embodiments of the invention, and how the cores are allocated among multiple users. While only two user/client sessions are illustrated, it will be understood that there may be as many client sessions as there are available cores or resources on the platform. Platform 100 is illustrated with 32 cores 110, but it will be understood that embodiments of the invention may be implemented on platforms with any number of cores (more than one). The cores 110 are coupled to a memory controller hub (MCH) 120 which enables control and communication with system memory 130. A "cross-section" of system memory 130 is shown to illustrate that multiple client sessions may have access to only a partition of memory. For instance, client session 1 has access only to system memory partition 131. Client session 2 has access only to system memory partition 132. The memory is fully isolated and secure between and among client sessions, as more fully described below.

As illustrated with the solid arrowed line that starts at isolated memory 131 and travels to client session 1 (151), four cores 111 are partitioned for use by session 1. As illustrated with the broken arrowed line that starts at isolated memory 132 and travels to client session 2 (152), four cores 113 are partitioned for use by session 2. 24 cores (115a-c) are unused in this example, and thus, available for additional client sessions. Sessions 1 and 2 are shown as being connected to network 150 via network adapters 145 coupled to multiple input/output hubs (IOHs) of input/output controller hubs (ICHs) 140. Each client session may have a dedicated network controller hub 145. In some embodiments, the clients may connect to the platform wirelessly.

Figure 3A:
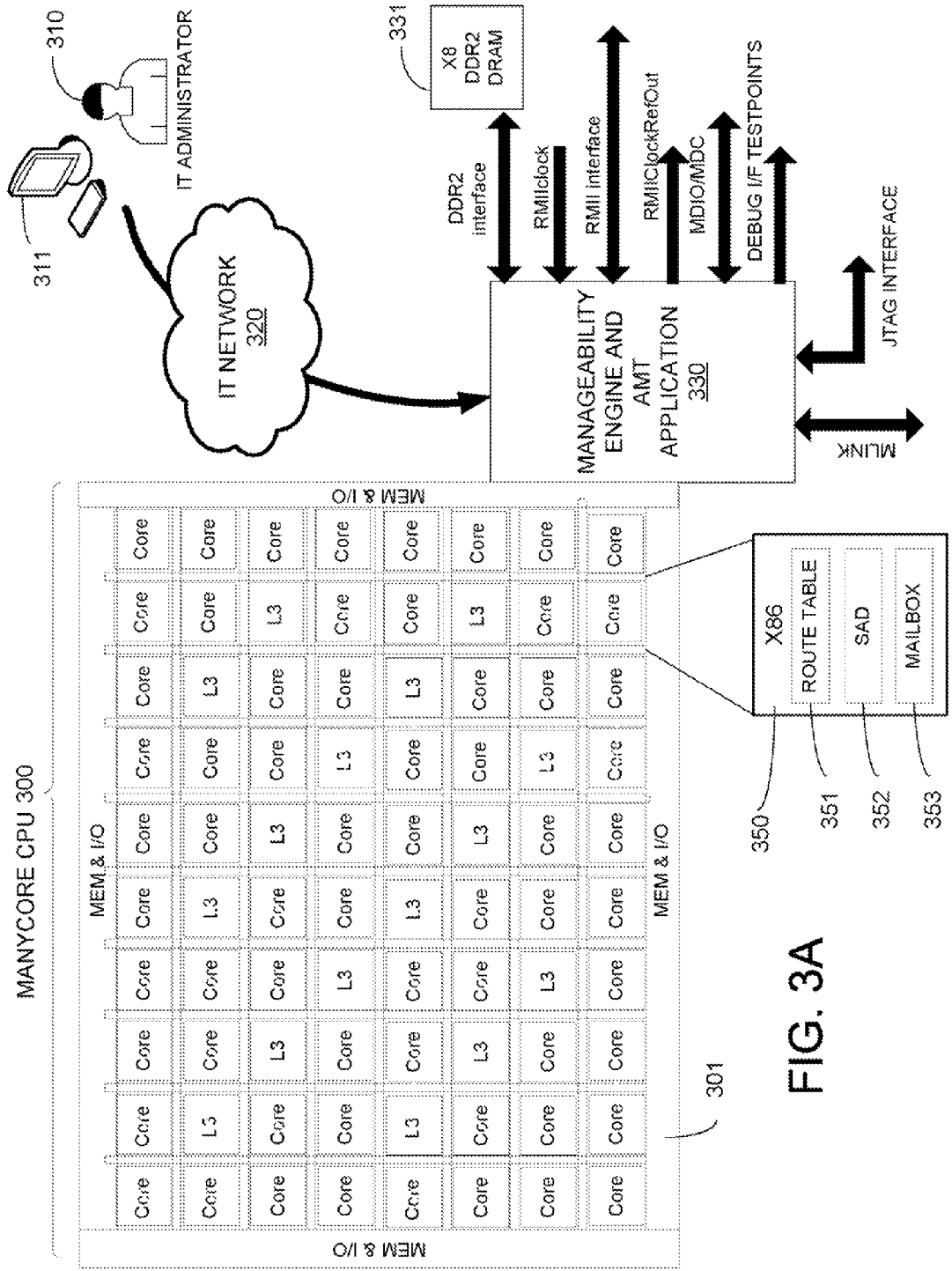
FIG. 3A is a block diagram illustrating the communication and control by the manageability engine, according to embodiments of the invention.

FIG. 3A is a block diagram illustrating the communication and control by the out-of-band processor, which may also be called a "manageability engine" (ME). In this illustration, the manycore processor 300 is shown with cores (processing units), as well as L3 cache. Cache adjacency to assigned cores may be important to policy models which may automatically allocate resources, based on demand and current availability. In an embodiment, an administrator 310, or in some cases, an automated administrative console 311, receive requests from users/clients who desire a session on the platform. In some cases, the request is a face to face request to be administered by the administrator. In another embodiment, a client may log onto the administrative console and make an electronic request, and even pay for metered time via a credit or debit card at the console.

The administrator (and console) is communicatively coupled to an out of band processor (ME) 330 via an IT network 320. The ME may have a number of internal RMII (Reduced Media-Independent Interface) buses and connections to various devices on the platform, for instance a double data rate 2 (DDR2) bus to a DDR2 memory device. The ME is coupled to the manycore processor 300 and controls the partitioning of resources into various secure client environments. It will be understood that the ME may be coupled to the manycore directly or via an internal proprietary bus. As illustrated, there is a memory and I/O layer 301 around the cores and L3 caches of the manycore. This layer represents connections to external memory and the I/O may be PCI express (PCIe) buses. The memory and I/O controllers are not shown in this figure. The PCIe buses may connect directly from the chip. A direct memory interconnect (DMI) bus may be used to connect the chip to a peripheral controller hub (PCH). A PCH may be used instead of an ICH. Other architectures may be used, based on chip voltages and other platform parameters.

Effectively, the resources need to be virtualized, or partitioned, such that a collection of cores are to be dedicated to a single client or user. Referring again to FIG. 2, the cores are partitioned as a four-core session 111, a 12-core session or spare, 115c, a six-core session or spare 115a, a six-core session or spare 115b, and a four-core session 113. The hardware is programmed, including but not limited to, the links/fabric/network between the processors, in order to segregate different sets of cores, memory and I/O. In this illustration, the platform is segregated into the equivalent of five individual processing entities. Once configured, each processing entity, or session, will have dedicated memory in system memory 130, a dedicated network adapter 145, etc. In existing systems this type of segregation would be defined before boot, and remain static. In some embodiments, the platform allows only one user and session, for instance, a desktop model, and unused cores are unavailable to the user until a further metered payment is made. However, in embodiments of the present invention, cores may be dynamically allocated and active cores and inactive securely partitioned from each other. Once the user is authorized to access additional cores, they are made available via a repartitioning.

Referring again to FIG. 3A, the ME 330 enables the manycore platform to be managed externally to change the configuration of cores and resources within the platform, on demand. In one embodiment, the platform adheres to a policy based partitioning, i.e., the policy may be based on a pay-as-you-go model, where one or more users pay for a finite amount of compute power (number of cores and memory) and a finite amount of compute time. If a user's workload increases or decrease, the user may request a readjustment of resources, and a like readjustment of the fee for those metered resources. The ME 330 communicates with the chipset of the platform to initiate the changes in resource partitioning.

Each core 350 in the manycore chipset 300 has a router, or route table 351, that that identifies which other cores it is connected to at any given time. Each core also has source address decoder (SAD) 352 which tells the core which portions of memory it may use. Only those portions of memory programmed into the SAD are accessible to the core. Each core may also have a mailbox register 353 to hold information received from the ME and to be processed. In some embodiments, the core is an X86 processing unit. The ME 330 programs the core's on-processor route tables to define the current connections. Super privileged firmware working in concert with the ME 330 programs the on-processor routers, configuration registers and memory controller 120 that only the firmware can access. The term configuration register may be used in this description to represent interfaces/elements that software accesses to manage the SAD/Router/mailbox elements; e.g., any SMM or ME-visible hardware that is changeable. An operating system executing on a core has no access to these elements of the chipset. The on-processor router is configured to define which core is connected to which other core, which core is connected to which memory partition, and which cores are connected to which I/O devices. In manycore platforms, the cores are connected with control and data lines as compared to other types of networks, but the connections are built-in to the chipset. The cores and memory controllers are connected with registers that only the platform firmware can access. The article entitled "Research Challenges For On-chip Interconnection," by John D. Owens, et al., (IEEE Computer Society. 0272-1732/07 2007), provides some additional information about the interconnections between and among the cores. This article may also be found on the public Internet at URL doi*ieeecomputersociety*org/10.1109/MM.2007.91.

Figure 3B:
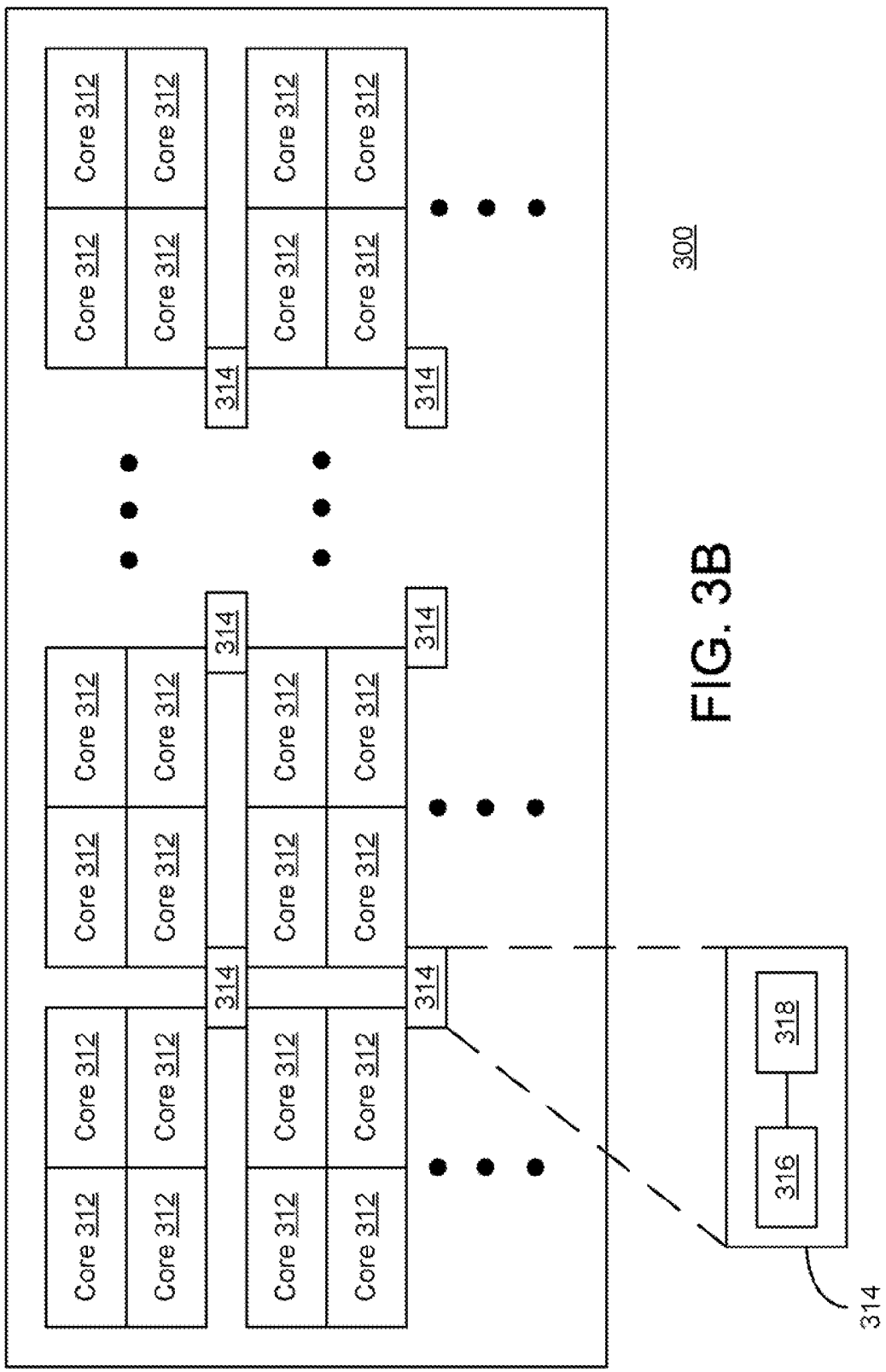
FIG. 3B is a block diagram illustrating the control and communication among cores, as shown in FIG. 3A, according to an embodiment of the invention.

FIG. 3B is a block diagram further illustrating the control and communication among cores, according to an embodiment of the invention. FIG. 3B illustrates selected aspects of a manycore computing system having access control logic, according to an embodiment of the invention. System 300 includes a number of cores 312 which are interconnected by routing logic 314. Cores 312 may be general purpose processor cores, graphics cores, and the like. It is to be appreciated that system 300 may include nearly any number of cores (e.g., 2, 4, 8, 16, 32, 64, 128, etc.).

Routing logic 314 may include the source address decoders (SADs) 352 and/or route tables 351 that are used to interconnect cores 312. Various aspects of routing logic 314 may be configurable. For example, how physical addresses are decoded may be configurable and/or the values in the route tables may be configurable.

In some embodiments, at least some of the instances of routing logic 314 include access control logic 316 and control status register (CSR) 318. Access control logic 316 may determine whether an agent is authorized to change the values stored in CSR 318. In some embodiments, access control logic 316 requires that an agent seeking to access CSR 318 provides a public key matching a private key that was previously provisioned within system 300. In alternative embodiments, a different mechanism may be used to authenticate an agent. In some embodiments, access control logic 316 uses a cryptographic authentication protocol to authenticate an agent. In some embodiments, access control logic 316 is implemented, at least in part, in hardware. In alternative embodiments, access control logic 316 may be implemented, at least in part, in platform microcode.

In an embodiment, the platform further comprises a peer to peer (pTp) interconnect technology, also sometimes called common system interface (CSI) architecture. A CSI, or pTp, system processor may include an integrated memory controller to reduce the memory access latency. Server systems may now be built using two to hundreds of such processors. In such systems, only one processor executes BIOS code to initialize memory and other portions of the system. However, as the number of processors and memory controllers has increased, the mechanisms to initialize the system and boot an operating system commonly take extended periods. As a result, initialization may be parallelized between the multiple processors.

A pTp is a reprogrammable interconnect, where the reprogramming is by a distinguished platform agent to provide, gather and separate different pools of computing resources on a platform.

In some pTp based multi-processor systems, all of the processors execute the BIOS code in parallel and perform a Built-in Self Test (BIST), memory initialization, and the like to speed up the system boot time. These activities are coordinated by a Boot Strap Processor (BSP) to collect the data from each of the other processors, which may be referred to as Application Processors (AP), and boot the operating system. Parallel initialization increases the computation requirements to initialize memory and pTp links. As a result, processor cache is configured as a temporary data store, which may be referred to as Cache-As-RAM (CAR), to the processor socket in order to assist in the memory, BIST execution, and pTp initialization.

However, the temporary data store in one processor cannot be accessed by other processors. In particular, the BSP cannot directly access the AP temporary stores to create global Source Address Decoder (SAD) entries to represent the whole system. Previous efforts to allow the BSP to create the global SAD include using a Configuration Space Register ("CSR"), a chipset or non-core register accessible by both BSP and AP processors, as a mailbox to exchange data.

In an embodiment, a platform may have multiple processors configured to communicate using pTp technology, and each processor in a single socket has many cores configured, as discussed above.

Figure 4:
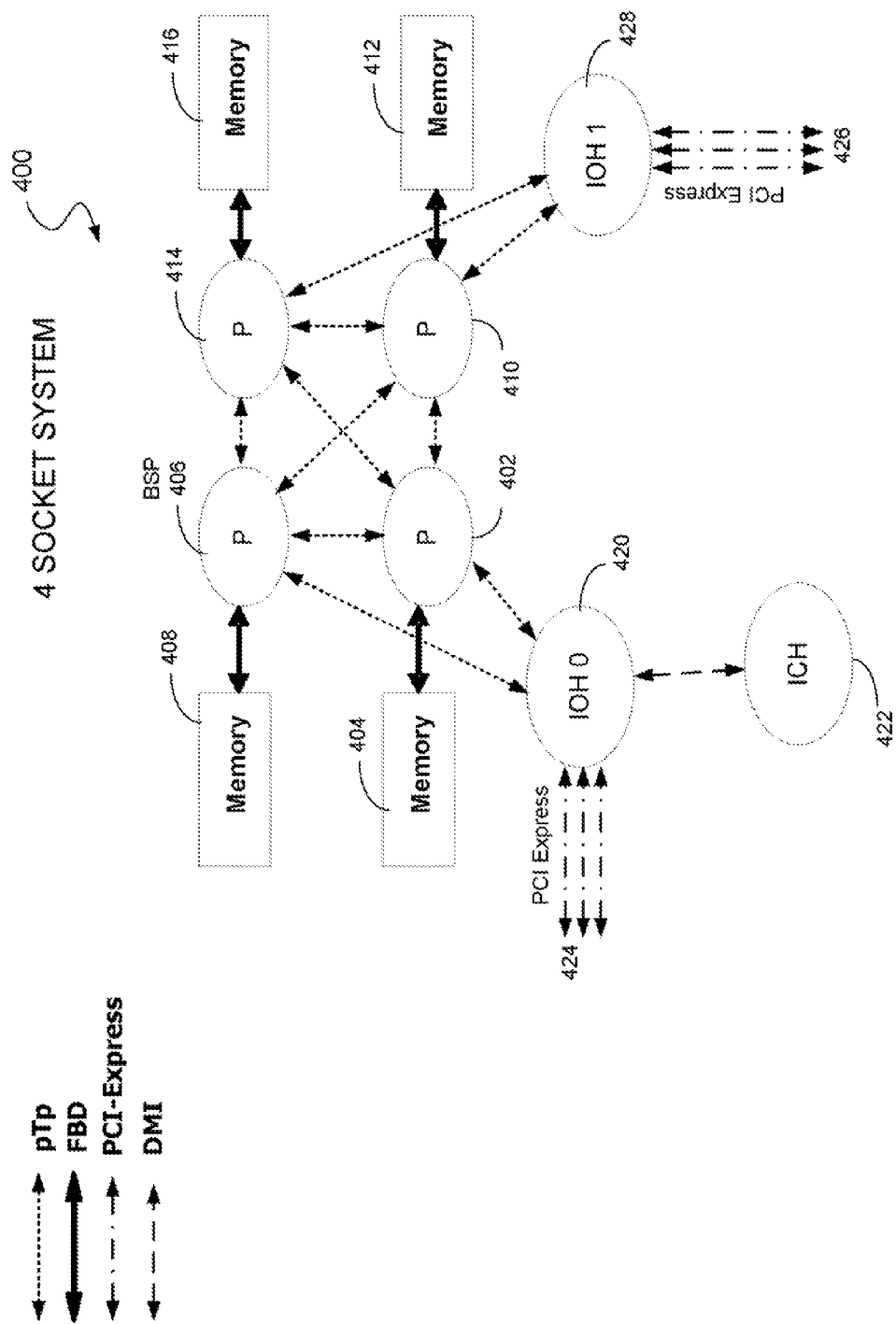
FIG. 4 is a block diagram of a peer to peer interconnect system, according to an exemplary embodiment.

FIG. 4 is a logical block diagram of a system 400, according to an exemplary embodiment. The system 400 includes four processing units 402, 406, 410 and 414. Processor 406 is the bootstrap processor (BSP). The processors 402, 406, 410, 414 each include a local memory subsystem 404, 408, 412, and 416, respectively. The system 400 also includes two input/output hubs IOH 0 420 and IOH 1 428. The input/output hubs 420, 428 provide connectivity to input/output devices, such as input/output controller hub (ICH) 422 and PCI Express 424, 426. Processor-to-processor and processor-to-input/output hub 420, 428 communication may be performed using pTp packets. Each pTp component contains a Routing Table Array (RTA) and a SAD. The RTA provides the pTp packet routing information to other sockets. The SAD provides mechanisms to represent routing of the resources such as memory, input/output, and the like. Each processor 402, 406, 410, 414 also contains a Target Address Decoder (TAD). The TAD provides mechanisms to map system addresses to processor 402, 406, 410, 414 memory 404, 408, 412, 416 addresses, respectively.

In a link-based multi-processor system, such as the system 400, after the system 400 is reset, the Basic Input/Output System (BIOS) starts to execute from each processor 402, 406, 410, 414 in a parallel manner. Each processor 402, 406, 410, 414 performs its own power on self test (POST) and initializes the components in its respective domain, such as local links, local memory, and attached local devices. Initialization of each processor 402, 406, 410, 414 also detects error conditions. The BIOS logs this processor 402, 406, 410, 414, which may also be referred to as a socket, information into local processor storage, such as cache-as-RAM (CAR) or local memory 404, 408, 412, 416 depending on the boot stage and the particular embodiment.

However, during system 400 boot, one of the processors 402, 406, 410, 414 is selected to control the whole system 400 boot. This processor is referred to as a Bootstrap Processor (BSP). In this example processor 406 is the BSP. The other processors 402, 406, 410, 414 are called Application Processors (AP).

Major tasks performed by the BSP include discovering the system 400 topology and setup of RTAs such that all components may communicate with each and synchronizes the socket-based information recorded by other processors 402, 406, 410, 414. The BSP also performs the remaining system level initializations, such as setup of the system address map, initialization of input/output devices, and the like. The BSP may also be tasked with loading an operating system on the system 400.

The synchronization step is important. The synchronization steps performs many functions including getting information including memory organization, DIMM size, memory size, and error information, to construct a global system 400 address map and it determines how to distribute the memory across the system 400. A common way to synchronize information before the system 400 memory addresses are setup is using a scratch register as a mailbox. The mailbox may include two scratch registers—one scratch register as command register through which the BSP and APs may communicate command information, and the other to exchange data. Other communication mechanisms may be used.

Embodiments of the invention allow dynamic reallocation of cores on a single socket processor to the equivalent of virtual machines, or user sessions/environments. The core's control logic and registers define the interaction of the core with other cores, and with memory. By reprogramming the cores' configuration, many permutations of environments (sessions) may be generated to provide a variable multi-user environment, or provide a single environment with varying processing capacity.

In an embodiment, a message is received by the ME to configure a six core session with 1 GB of memory and two network controllers. The ME may then generate a system management interrupt (SMI) within the system management mode (SMM) to reprogram the routing controllers. In other embodiments, the route tables are written by microcode, or other constructs. The SMM code has access to the routing controller registers, but the operating system(s) (OS) do not. Concurrent partitions, or sessions, may run simultaneously. To each partition, it seems that the partition is a unique machine (e.g., a virtual machine, or session). The OS running on the partition is isolated from other partitions and has no direct access to the chipset or router controllers to modify the platform configuration. The OS also has no access to memory or resources that are dedicated to other partitions, or sessions.

In an embodiment, cache memory, as shown as L3 blocks in the manycore 300, may be allocated to a partition by being allocated to a specific core.

Once the console or administrator is directed to authorize resources for a session, it must be determined whether sufficient cores are available to allocate; this calculation may be culled via active management technology (AMT) reporting the availability of "unassigned" cores which the ME can track via a bit-map of assigned versus unassigned processor elements. In an embodiment, the console sends a web services simple object access protocol (SOAP) message to the ME to learn how many cores are unallocated. The ME may send an SMI to a chipset register with a command to request information about unallocated cores and resources. The ME effectively sends an in-band message to the BIOS or firmware to determine the information. If the ME needs to communicate with an OS, an interrupt may be generated. If the ME needs to communicate with the firmware, an SMI may be generated once availability is determined. The ME reserves the appropriate resources by generating an SMI event into a register to write into the route tables of the cores. The SMM reads the information in the message register and performs the appropriate writes to route tables.

In some implementations, there may be physical limits regarding which cores may be combined in a session, or which caches may be connected to specific cores. The ME may have a predetermined platform policy that dictates these limitations and drives the generation and allocation of sessions and partitions. In some cases, sufficient adjacent cores may not be available, or the available cores may not have cache connectivity. In this case, in an embodiment, the ME may use platform policy to determine whether a requested configuration is possible given currently allocated resources, and whether the resources may be reallocated to provide for a session that would not otherwise be available.

In an embodiment, when the ME determines that a reallocation is required to generate a newly requested session, a command to stop all processing on allocated cores may be sent from the ME to the chipset. The elements in question are to be added or removed and all address decoders and routers are to be reprogrammed—even for cores that are currently allocated to a session and processing applications. This action is analogous to reliability, availability and serviceability (RAS) activities on processors for hot plugging redundant units. However, in this case, the reallocation is dynamically performed for load balancing per customer request and not reliability.

The cores' application data and state may be stored into a globally-available memory space, such as System Management RAM (SMRAM) or sent to the ME and stored in temporary memory location of the ME. For more transactional aspects (i.e., to survive a power-cycle) the state may be stored by SMM to a system FLASH memory or the ME to its sequestered/protected FLASH prior to the reallocation operation, along with setting a "reallocation in process" flag around the movement of state.

Figure 5:
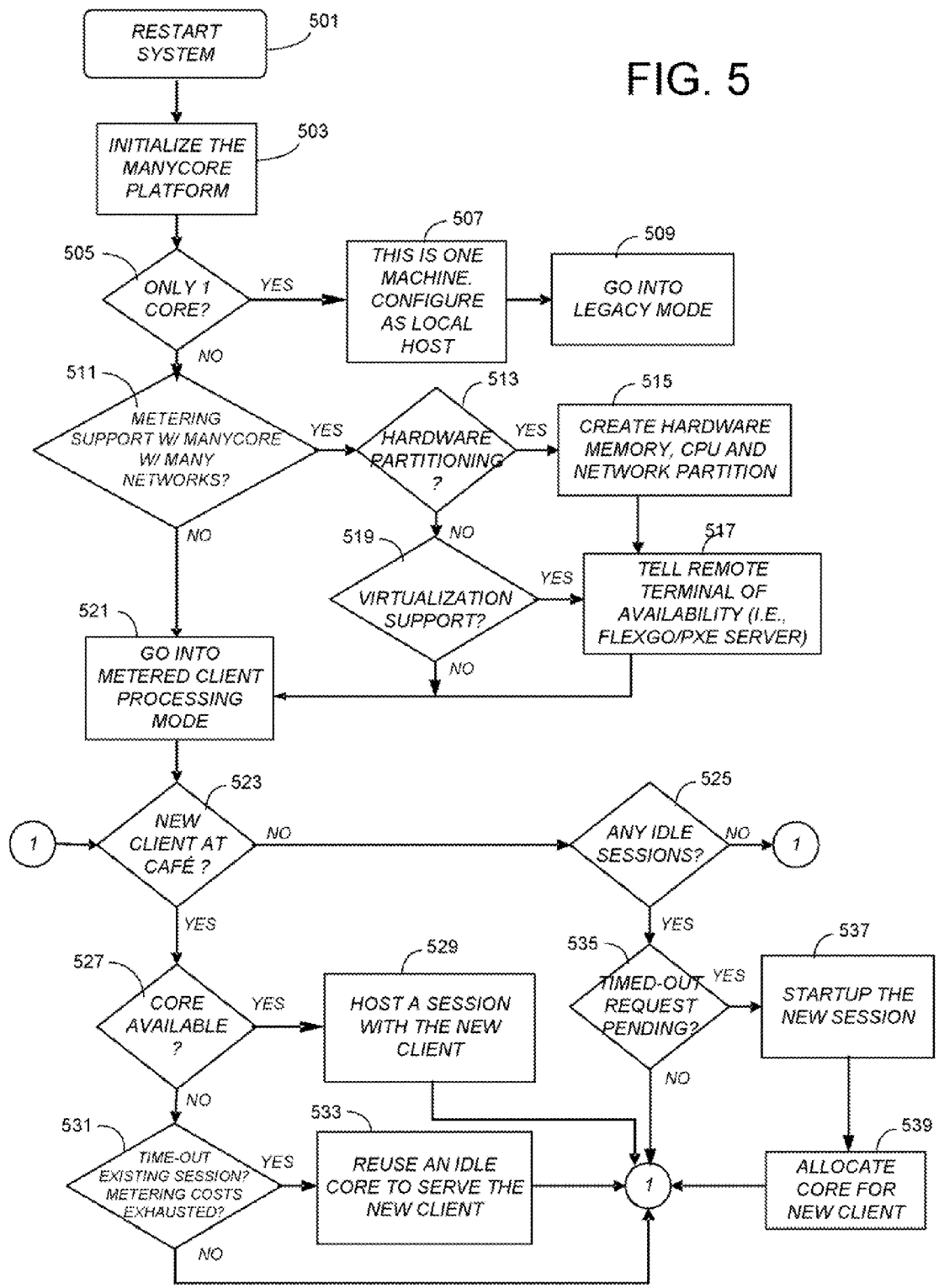
FIG. 5 is a flow diagram illustrating the platform initialization and session allocation process, according to an embodiment of the invention.

FIG. 5 is a flow diagram illustrating the platform initialization and session allocation process, according to an embodiment of the invention. The platform is restarted in block 501. The platform is initialized in block 503. This initialization may vary depending on the architecture of the platform. For instance, the platform may be implemented with a peer to peer interconnect (pTp) to support a layered protocol scheme. Once initialized, if there is only one core available, as determined in block 505, then the platform is a legacy platform to be configured as a local host, in block 507. Legacy mode is commenced in block 509.

If the platform has multiple cores, then it is determined whether metering support is implemented with many networks in block 511. If so, then it is determined whether hardware partitioning, for instance with an embedded partition is implemented, in block 513. If hardware partitioning is available, then the hardware, memory and network partitions are created in block 515. The route tables and SADs are initialized, perhaps to a default partitioning. If a last known good configuration has been saved, the initialization may be to this last known good configuration. During this initialization, the firmware dictates which partition configuration should be used. If no hardware partitioning is implemented, then it is determined whether virtualization is supported in block 519. While virtualization partitioning may be possible, it is not further discussed below. For both virtualization and hardware partitioning, a remote console is then notified of the availability of the resources in the platform, in block 517. In an embodiment, this notification is effected by the BIOS generating a message to the ME, and the ME generating a web services message to send to the console (310/311). In all multi-core scenarios, metered client processing mode is entered in block 521.

When a new client enters the icafé, or other environment, the client requests a specific amount of computational capability to an administrator or an automated system. In an automated model, the client may pay for the metered usage via credit or debit card right at the console. It will be understood that various methods may be used to enter the information, such as manual keyboard input, swiping a credit card or wirelessly reading a smartcard, etc. In the case of a human interface, the administrator enters the information regarding requested resources into a console. For purpose of simplification, both the automated method and human interface point of origin will be referred to as the "administrative console." The administrative console sends a request to the platform via the ME to determine whether cores are available to assign to the client, in block 527. If cores are available, the cores and associated memory, cache and I/O devices are assigned, as described above, and the route tables, and SADs are appropriately assigned, in block 529. The client may then begin using a dumb terminal (I/O device) assigned to the client session.

If the requested number of cores, or other assets, are not immediately available, the client request may time-out, i.e., be put on a queue of clients requesting allocations that are not yet available. It is determined whether other client sessions have timed out (i.e., used up their allotted metered resources/time), in block 531. If not, processing continues at block 523 and will loop until resources are available for the requested client session. Alternatively, platform policy is compared to allocated cores and a rebalancing of platform assets may be initiated to enable the client session to be created.

When there is one or more client session that has exhausted its metered resources, idle cores, memory, cache and I/O devices may be reallocated to the new client session, in block 533.

If there is no pending new client request, the system monitors to identify idle sessions, in block 525. If there are idle sessions (i.e., a session that is not using the allocated resources) and if a timed-out request is pending, as determined in block 535, then the new session may be allocated in block 537. The cores, and other resources, are reallocated in block 539. When there are no timed-out requests for a session pending, processing continues at block 523 to wait for new requests. Because some client sessions may require fewer resources during human interaction, it may be possible to reallocate cores between one or more client sessions on the fly, and still be able to deliver the requested processing capacity. This may be analogized to overbooking the resources. However, in contrast to overbooking a commercial airline carrier where excess passengers are bumped to a next flight, overbooked client sessions basically have their resources swapped back and forth during idle times. Caution must be taken before implementing a platform policy allowing overbooking, however, to ensure that sufficient idle time will be available to effectively swap cores and other resource without noticeably impacting on user performance. In other cases, idle sessions refer to sessions that are no longer active, and the resources may be reallocated at will.

Load balancing of resources and swapping idle resources between and among client sessions requires a secure memory to temporarily store processing data for a client session, as discussed above. This memory store may be coupled to the ME and operating systems on the manycore processor will have no access to it.

In another embodiment, a user purchases a platform having n cores. The user pays for m number of cores, where 1≥m≥n, and m cores are to be activated. When the system is configured, m cores and associated resources are activated. Thus, the route tables of the cores are configured to identify the active resources in the platform. The user may only use the activated resources. If the user determines that additional resources are needed, additional payments can be made to the vendor and the vendor may "upgrade" the platform by reprogramming the core's route tables, SADs, etc. The platform may be configured such that only the vendor, from a remote terminal, has authorization to reprogram the cores. The platform may be configured so that a key must be entered by a local administrator to activate the additional cores and resources. Regardless, the SMI to force the reprogramming of the route tables, etc., is to be executed only when the vendor has authorized the upgrade. It will be understood that various techniques may be used to safeguard this command. Similar incremental configuration cost models may have been used in existing systems for processor and memory upgrades, but none have been used to activate individual cores on a single socket processor.

In an embodiment, the platform has an embedded partition architecture to create secure hardware partitions of processors and other resources. This architecture is also known as a platform resource layer (PRL) architecture. In a platform resource layer (PRL) architecture, or embedded partition architecture, various components of the platform are enhanced to enable partitioning of processor, memory and other resources.

Figure 6:
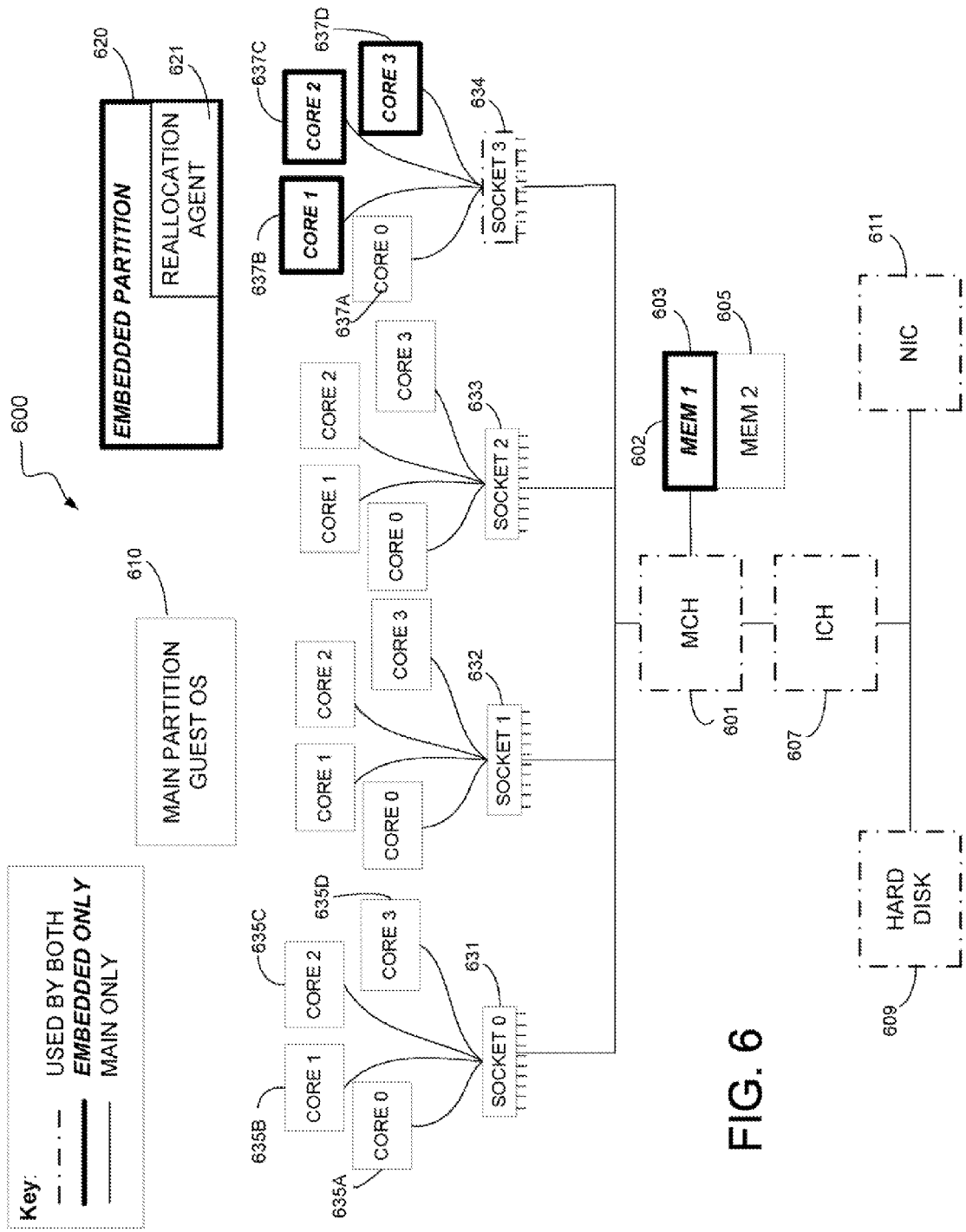
FIG. 6 is a block diagram illustrating an embedded partition platform architecture, according to embodiments of the invention.

Referring now to FIG. 6, there is shown an exemplary block diagram of a platform 600 having a PRL architecture, according to embodiments of the invention. This is an architecture instance that is usable in an internet Café wherein each individual processor instance may be assigned to a given Café patron. To better illustrate partitioning, components that are available to the main partition 610 are drawn with solid blocks. Components available to the embedded, or system partition 620, are drawn with bold, solid blocks. Components available to both partitions are drawn with a block alternating with dots and dashes.

In this exemplary embodiment, a platform has four multi-core processors in Sockets 0-3 (631-634). While this example shows only four processor sockets, it will be apparent to one of ordinary skill in the art that various configurations of processors and cores may be used to practice embodiments of the invention. For instance, Socket 0 may have four processing cores 635*a-d*. In essence, in this example, the illustrated embodiment has 16 effective processors on the platform (e.g., four sockets with four cores in each socket). In this example. Sockets 0-2 (631-633) are available only to the main partition 610. Socket 3 (634) is available to both the main partition 610 and to the embedded partition 620. Within Socket 3 (634), core 0 is available only to the main partition 610, and cores 1-3 are available only to the embedded partition 620. The embedded partition 620 may have a reallocation agent 621 as part of the firmware to communicate with ME, via mailbox messages, to effect the reprogramming of the cores. SMM is a global capability and it can reach out and access any socket. The reallocation agent may contain authorization code to ensure that the vendor has authorized allocation of additional cores and resources.

In this embodiment, the platform has a memory controller hub (MCH) 601 (also known as north bridge) coupled to memory 602. Memory 602 may have two partitions MEM1 (603) and MEM2 (605). Memory partition MEM1 (603) is available only to the embedded partition and memory partition MEM2 (605) is available only to the main partition. The chipset containing the MCH 601 is configured to partition the memory using hardware constructs, in contrast to a VMM solution which uses software constructs. It will be understood that memory 602 may be a hard disk, a floppy disk, random access memory (RAM), read only memory (ROM), flash memory, or any other type of medium readable by processor. Memory 602 may store instructions for performing the execution of embodiments of the present invention. While only two partitions are shown in this example, it will be understood that there may be more than one guest OS, each running in its own partition. It will also be understood that each single processor socket may have any number of cores.

The MCH 601 may communicate with an I/O controller hub (ICH) 607, also known as South bridge, via a peripheral component interconnect (PCI) bus. The ICH 607 may be coupled to one or more components such as PCI hard drives, legacy components such as IDE, USB, LAN and Audio, and a Super I/O (SIO) controller via a low pin count (LPC) bus (not shown). In this example, the ICH 607 is shown coupled to a hard disk drive 609 and to a network interface controller (NIC) 611.

The MCH 601 is configured to control accesses to memory and the ICH 607 is configured to control I/O accesses. In an embedded partition architecture, the chipset is configured by the firmware, upon boot, to partition the various resources on the platform. In some cases, there may be only one partition and the platform acts like a legacy platform in most respects. In the example shown, there are two partitions, a main partition 610 and an embedded partition 620. Each partition designated is given a unique partition identifier (ID).

With an embedded partition configuration, when a device sends an alert, the chipset may properly route the alert to the appropriate partition, as this information is encoded at boot time. In a VMM enabled system, the hardware passes the device alerts to the VMM (virtualized devices) and the software routes the information appropriately to the various virtual machines. An embedded partition may act as hardware assisted virtualization.

In an embodiment, a reallocation agent is embodied within a VMM which controls all guest virtual machines (VMs) and guest operating systems (OS's) running on the platform. In another embodiment, the reallocation is embodied in a privileged partition, process or hypervisor that controls I/O requests for individual OS's.

The techniques described herein are not limited to any particular hardware or software configuration; they may find applicability in any computing, consumer electronics, or multi-core processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
a multi-core platform having a single socket processor comprising a plurality of processing cores, one or more of the plurality of cores capable of being partitioned into at least one of a plurality of client environments for simultaneous use by multiple clients;
an embedded partition having a reallocation agent to generate reallocation instructions to be communicated to a manageability engine; and
the manageability engine to be communicatively coupled to the plurality of processing cores and comprise out-of-band capabilities to receive the reallocation instructions, the reallocation instructions comprising configuration information defining the plurality of client environments, wherein the configuration information for a client environment comprises identification of one or more of the plurality of processing cores and other resources to be allocated to the client environment,
wherein the manageability engine to configure the plurality of processing cores' route table and a source decoder to process message stored by a mailbox, wherein configuration of the route table and the source decoder by the manageability engine is facilitated by a super privileged platform firmware without having assistance from or access to an operating system on a core, wherein each processing core comprises the route table to identify to which other resources the core is connected, a source address table identifying which memory is accessible to the core, and the mailbox to store the messages received from the manageability engine,
wherein the manageability engine is further to facilitate, for a time limit, one or more clients to have access to the client environment having allocated the one or more of the plurality processing cores and the other resources.

2. The apparatus of claim 1, wherein the configuration information further comprises the time limit for allowing the client environment to remain accessible to the one or more clients, wherein the mailbox to further store the messages received from the manageability engine on the platform providing configuration details for the core to configure the route table and source address table, wherein a mailbox message includes a web services message.

3. The apparatus of claim 2, wherein the embedded partition is isolated from other partitions on a platform via hardware constructs, the reallocation agent communicating the reallocation instructions via the mailbox messages and having an authorization code to ensure the one or more clients are authorized access to the one or more of the plurality of processing cores and the other resources at the client environment, wherein the reallocation agent is embedded within a virtual machine monitor (VMM) that controls one or more guest virtual machines (VMs) and one or more guest operating systems (OS's) at the platform.

4. The apparatus of claim 1, wherein the manageability engine is further to:
reclaim the plurality of processing cores and the other resources assigned to the client environment when the time limit for allowing the client environment to remain accessible to the one or more clients is exhausted, wherein the client environment is subsequently deleted;
generate a system management interrupt within a system management mode to effect reprogramming of the plurality of processing cores;
reallocate idle resources to a new client environment; and
reallocate resources assigned to an existing client environment to the new client environment.

5. The apparatus of claim 1, wherein the platform comprises a multi-socket peer to peer interconnect architecture, wherein a platform agent is to isolate and combine different pools of computing resources by reprogramming interconnections among the plurality of processing cores and the other resources on the platform.

6. The apparatus of claim 3, wherein a first client of the one or more clients is to connect to a first client environment on the platform via a first, input/output device assigned and allocated to the first client environment; and
wherein a second client of the one or more clients is to connect to a second client environment on the platform via a second input/output device assigned and allocated to the second client environment, and wherein the first and second clients have no access to resources that are allocated to each other's client environments.

7. A method comprising:
generating, via a reallocation agent of an embedded partition, reallocation instructions to be communicated to a manageability engine; and
receiving, at a manageability engine communicatively coupled to a multi-core platform having a plurality of processing cores in a single socket processor, the reallocation instructions, via a message, requesting a new client environment sent by a remote administrative console, one or more of the plurality of cores capable of being partitioned into the new client environment, the reallocation instructions comprising configuration information defining the plurality of client environments for simultaneous use by multiple clients, wherein the configuration information for the new client environment comprises identification of one or more of the plurality of processing cores and other resources to be allocated to the client environment;

configuring, by the manageability engine, the plurality of processing cores' route table and a source decoder to process message stored by a mailbox, wherein configuration of the route table and the source decoder by the manageability engine is facilitated by a super privileged platform firmware without having assistance from or access to an operating system on a core, wherein each processing core comprises the route table to identify to which other resources the core is connected, a source address table identifying which memory is accessible to the core, and the mailbox to store the messages received from the manageability engine; and facilitating, for a time limit, one or more clients to have access to the client environment having allocated the one or more of the plurality processing cores and the other resources.

8. The method of claim 7, wherein the configuration information further comprises the time limit for allowing the client environment to remain accessible to the one or more clients, wherein the mailbox further to store the messages received from the manageability engine on the platform providing configuration details for the core to configure the route table and source address table, wherein a mailbox message includes a web services message.

9. The method of claim 8, wherein the embedded partition is isolated from other partitions on a platform via hardware constructs, the reallocation agent communicating the reallocation instructions via the mailbox messages and having an authorization code to ensure the one or more clients are authorized access to the one or more of the plurality of processing cores and the other resources at the client environment, wherein the reallocation agent is embedded within a virtual machine monitor (VMM) that controls one or more guest virtual machines (VMs) and one or more guest operating systems (OS's) at the platform.

10. The method of claim 7, further comprising:
determining whether the one or more of the plurality of processing cores and the other resources are available on the platform to achieve the requested new client environment;
generating, via the manageability engine, commands to effect dynamic reprogramming of the one or more of the processing cores on the platform, according to the request for the new client environment, when the one or more of the plurality of processing cores and the other resources are available, wherein the commands comprise the optional time limit for allowing the new client environment to remain accessible to the one or more clients;
queuing the request for the new client environment, when the one or more of the plurality of processing cores and the other resources are not available; and
reprogramming the one or more of the plurality of processing cores on the platform, according to the commands, to effect the request for the new client environment, via platform firmware access and without core operating system assistance or access.

11. The method of claim 10, wherein determining further comprises:
generating, via the manageability engine, a system management interrupt comprising a command to request information about unallocated processing cores and resources, and wherein generating the commands further comprises generating a system management interrupt event into a register to write into a route table and source address decoder of a processing core.

12. The method of claim 10, wherein queuing further comprises:
determining whether the plurality of processing cores and the other resources can be allocated from idle client environments or from active client environments; and
reallocating the processing cores and the other resources among at least one of an active client environment, an idle client environment, and the unassigned processing cores and resources, to the new client environment;
sending a message to stop all processing on the allocated processing cores from the manageability engine to the platform chipset before the reallocating of the plurality of processing cores and the other resources; and
migrating execution states among the at least one of an active client environment, an idle client environment and unassigned cores and resources, to provide newly reallocated client environments with a transactional-safe execution state.

13. The method of claim 12, wherein the migrating further comprises:
saving the execution state of the at least one active client environment to a protected area of a memory store coupled to the manageability engine; and
restoring the execution state of the at least one active client environment after the reallocation of cores and resources to the new client environment.

14. At least one non-transitory machine-readable medium having thereon instructions which when executed by a processing device, cause the processing device to perform one or more operations comprising:
generating, via a reallocation agent of an embedded partition, reallocation instructions to be communicated to a manageability engine; and
receiving, at a manageability engine communicatively coupled to a multi-core platform having a plurality of processing cores in a single socket processor, the reallocation instructions, via a message, requesting a new client environment sent by a remote administrative console, one or more of the plurality of cores capable of being partitioned into the new client environment, the reallocation instructions comprising configuration information defining the plurality of client environments for simultaneous use by multiple clients, wherein the configuration information for the new client environment comprises identification of one or more of the plurality of processing cores and other resources to be allocated to the client environment;
configuring, by the manageability engine, the plurality of processing cores' route table and a source decoder to process message stored by a mailbox, wherein configuration of the route table and the source decoder by the manageability engine is facilitated by a super privileged platform firmware without having assistance from or access to an operating system on a core, wherein each processing core comprises the route table to identify to which other resources the core is connected, a source address table identifying which memory is accessible to the core, and the mailbox to store the messages received from the manageability engine; and facilitating, for a time limit, one or more clients to have access to the client environment having allocated the one or more of the plurality processing cores and the other resources.

15. The non-transitory machine-readable medium of claim 14, wherein the configuration information further comprises the time limit for allowing the client environment to remain accessible to the one or more clients, wherein the mailbox further to store the messages received from the manageability engine on the platform providing configuration details for the core to configure the route table and source address table, wherein a mailbox message includes a web services message.

16. The non-transitory machine-readable medium of claim 15, wherein the embedded partition is isolated from other partitions on a platform via hardware constructs, the reallocation agent communicating the reallocation instructions via the mailbox messages and having an authorization code to ensure the one or more clients are authorized access to the one or more of the plurality of processing cores and the other resources at the client environment, wherein the reallocation agent is embedded within a virtual machine monitor (VMM) that controls one or more guest virtual machines (VMs) and one or more guest operating systems (OS's) at the platform.

17. The non-transitory machine-readable medium of claim 14, wherein the one or more operations further comprise:

determining whether the one or more of the plurality of processing cores and the other resources are available on the platform to achieve the requested new client environment;

generating, via the manageability engine, commands to effect dynamic reprogramming of the one or more of the processing cores on the platform, according to the request for the new client environment, when the one or more of the plurality of processing cores and the other resources are available, wherein the commands comprise the optional time limit for allowing the new client environment to remain accessible to the one or more clients;

queuing the request for the new client environment, when the one or more of the plurality of processing cores and the other resources are not available; and reprogramming the one or more of the plurality of processing cores on the platform, according to the commands, to effect the request for the new client environment, via platform firmware access and without core operating system assistance or access.

18. The non-transitory machine-readable medium of claim 17, wherein the one or more operations further comprise:

generating, via the manageability engine, a system management interrupt comprising a command to request information about unallocated processing cores and resources, and wherein generating the commands further comprises generating a system management interrupt event into a register to write into a route table and source address decoder of a processing core.

19. The non-transitory machine-readable medium of claim 17, wherein the one or more operations further comprise:

determining whether the plurality of processing cores and the other resources can be allocated from idle client environments or from active client environments; and reallocating the processing cores and the other resources among at least one of an active client environment, an idle client environment, and the unassigned processing cores and resources, to the new client environment;

sending a message to stop all processing on the allocated processing cores from the manageability engine to the platform chipset before the reallocating of the plurality of processing cores and the other resources; and migrating execution states among the at least one of an active client environment, an idle client environment and unassigned cores and resources, to provide newly reallocated client environments with a transactional-safe execution state.

20. The non-transitory machine-readable medium of claim 19, wherein the one or more operations further comprise:

saving the execution state of the at least one active client environment to a protected area of a memory store coupled to the manageability engine; and restoring the execution state of the at least one active client environment after the reallocation of cores and resources to the new client environment.

* * * * *